A. B. SINGER.
CHECK VALVE.
APPLICATION FILED FEB. 25, 1913.
1,205,038.
Patented Nov. 14, 1916.
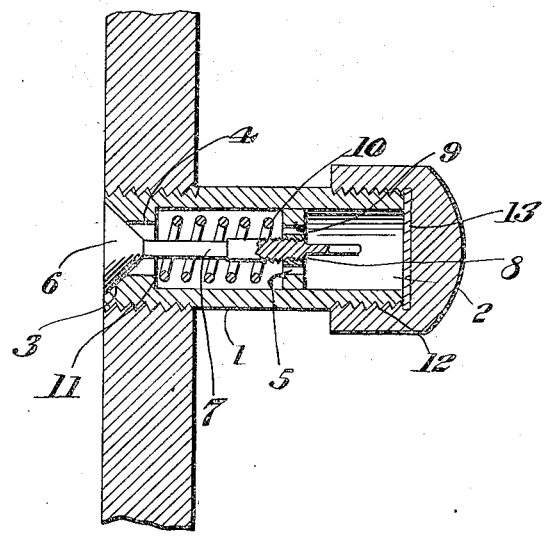
Witness
Louis A. Stabler
Inventor
Alfred B. Singer,
By Victor J. Evans
Attorney

UNITED STATES PATENT OFFICE.

ALFRED BERTRAM SINGER, OF PHILADELPHIA, PENNSYLVANIA.

CHECK-VALVE.

1,205,038.

Specification of Letters Patent.

Patented Nov. 14, 1916.

Application filed February 25, 1913. Serial No. 750,623.

*To all whom it may concern:*

Be it known that I, ALFRED B. SINGER, a citizen of the United States, residing at Philadelphia, in the county of Philadelphia and State of Pennsylvania, have invented new and useful Improvements in Check-Valves, of which the following is a specification.

This invention relates to improvements in valve construction and more particularly to check valves.

The primary object thereof is to provide a valve of this type embracing a minimum number of parts so as to simplify the construction of check valves, reducing its cost of manufacture and increasing its efficiency.

With the above and other objects in view my invention consists in the combination, arrangement, and details of construction disclosed in the drawings and specification and then more particularly pointed out in the appended claim.

In the drawings, wherein similar reference characters refer to similar parts in the drawing, the figure shows a section through the check valve to be described.

The valve is constructed as follows: It is adapted for use in permitting a flow of air in one direction only and is provided with means for offering greater or less resistance to the introduction of air. In the figure the valve is shown threaded into the wall of a receptacle such as a cylinder. The casing or hollow valve body 1 is formed open ended, the main bore 2 being substantially of uniform diameter, but said valve body is formed upon its threaded end with an internal transverse shoulder 3 thereby contracting the bore 2 as at 4. This shoulder provides an opening which flares outwardly to form a conical valve seat for a conical valve 6. That the bore is of uniform diameter clearly appears from the figure. A rod 7 is secured to the valve 6 and has a threaded portion 8 formed thereupon, a head 5 being provided which slides snugly in the valve body 1. This head serves as the only support for the rod 7 when the valve 6 is moved to open position. The head 5 is formed with a plurality of air ports 5 by means of which air may pass out of the bore of the valve body when the valve 6 is opened. The spring 11 bears against the shoulder at its inner edge and also bears against the head 5 so as to hold the valve 6 normally closed. It will be seen that by sliding the head 5 the spring 11 is put under tension, which tension can be adjusted by threading the head 5 at any point of the rod 7. The cap 12 is threaded onto the valve body 1 and compresses a packing ring 13 so as to prevent leakage of the air. It will be seen that when the valve 6 is closed against body 1 it fits flush with one end edge of the valve body 1. When the cap 12 is removed air can flow into the cylinder or other receptacle to which the valve body is connected when the valve 6 is open for this purpose.

Numerous modifications may be resorted to in practice not departing in principle from the details of construction shown herein.

Having thus described my invention, what I claim is:

In combination, a wall having a threaded opening, a hollow valve body having one end threaded into said opening, said valve body being formed within its threaded end with a transverse shoulder having an opening flaring outwardly to form a valve seat, a conical valve fitting said seat flush with the periphery of the threaded end of said valve body, a rod carried by said valve and having an outer threaded portion, a head slidably engaging said valve body and having a central threaded sleeve in which is adjustably threaded the valve rod, said head forming the sole guide for said rod when said valve is unseated and having a plurality of air ports around said sleeve, a spring coiled around said rod, bearing at one end against said shoulder and against said head at its opposite end, said head being adapted to retain said spring against the shoulder, and a removable cap connected to the other end of said valve body.

In testimony whereof I affix my signature in presence of two witnesses.

ALFRED BERTRAM SINGER.

Witnesses:
JOHN A. SINGER,
Mrs. JOHN SINGER.